(12) United States Patent
Coghill, Jr.

(10) Patent No.: US 8,632,087 B2
(45) Date of Patent: Jan. 21, 2014

(54) ENERGY COIL SYSTEM FOR VEHICLES

(75) Inventor: Thomas E. Coghill, Jr., Virginia Beach, VA (US)

(73) Assignee: Kenetic Energy Storage Systems, LLC, Virginia Beach, VA (US)

( * ) Notice: Subject to any disclaimer, the term of this patent is extended or adjusted under 35 U.S.C. 154(b) by 487 days.

(21) Appl. No.: 12/589,243

(22) Filed: Oct. 20, 2009

(65) Prior Publication Data

US 2010/0148465 A1 Jun. 17, 2010

Related U.S. Application Data

(60) Provisional application No. 61/106,729, filed on Oct. 20, 2008.

(51) Int. Cl.
*B62M 1/10* (2010.01)
*B60T 1/10* (2006.01)

(52) U.S. Cl.
CPC . *B62M 1/105* (2013.01); *B60T 1/10* (2013.01)
USPC ........................................................ 280/214

(58) Field of Classification Search
USPC ............... 180/205.1, 54.2; 280/212, 214, 215
See application file for complete search history.

(56) References Cited

U.S. PATENT DOCUMENTS

| | | | | | |
|---|---|---|---|---|---|
| 328,709 | A | * | 10/1885 | Paessler | 280/212 |
| 1,374,797 | A | * | 4/1921 | Zaborsky | 280/215 |
| 1,409,454 | A | * | 3/1922 | Kolaczkowski | 280/214 |
| 2,908,356 | A | * | 10/1959 | Daarud | 185/39 |
| 6,019,385 | A | * | 2/2000 | Kelley et al. | 280/217 |
| 6,053,830 | A | * | 4/2000 | Glaeser | 474/101 |
| 6,557,877 | B2 | * | 5/2003 | Dunkley | 280/215 |

* cited by examiner

*Primary Examiner* — Paul N Dickson
*Assistant Examiner* — Wesley Potter
(74) *Attorney, Agent, or Firm* — Laurie Barcia

(57) ABSTRACT

Exemplary embodiments of a bicycle are provided comprising a bicycle frame having a front wheel support section, a rear wheel support section and a center section. The bicycle includes a rear wheel rotatably coupled to the rear wheel support section. The bicycle further includes a front wheel having a hub rotatably coupled to the front wheel support section, the hub being configured and integrated with an energy coil system that stores energy during a forward revolving movement of the front wheel, and when the energy is fully stored, the energy coil system is locked until selectively released.

6 Claims, 12 Drawing Sheets

ENERGY COIL SYSTEM FOR VEHICLES

COPENDING APPLICATIONS

This application claims priority benefit of Provisional Patent Application No. 61/106,729 filed Oct. 20, 2008, titled "ENERGY STORING DEVICE", and having the same inventor of the instant patent application.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

I. Field

The invention relates to storage energy coils for vehicles such as bicycles, non-motorized vehicles and motorized vehicles.

II. Background

The benefit of storing energy in a coil is well known. Stored energy can be used to propel a bicycle forward when it is travelling uphill; however, many energy storage systems do not allow the user to selectively store energy. For example, some energy storage systems are tied to the braking system.

Some of the energy systems are attached to the rear wheel. However, the rear wheel is very crowded with brakes, the chainwheel and other mechanisms to rotate the wheels of the bicycle as the rider pedals. Furthermore, placing the energy system on the rear wheel does nothing to helps the rider to rotate a front wheel that may be difficult to move in various terrains or if stuck.

Thus, there is a need for an energy coil system for bicycles that can allow the user to selectively store energy. When the energy coil system is in a winding or energy storing mode, the energy is stored by the forward revolving movement and in a hub of the front wheel. The release of the energy propels or drives the front wheel forward a distance.

Thus, there is a need for an energy coil system for bicycles that selectively renders the bicycle as an all-wheel drive non-motorized vehicle. The energy coil system may assist in driving or propelling by force of the front wheel, while pedals may be used to propel the rear wheel forward.

SUMMARY

The aforementioned problems, and other problems, are reduced, according to the exemplary embodiments, by the energy coil system and methods for vehicles set forth below.

According to an exemplary embodiment, a bicycle is provided comprising a bicycle frame having a front wheel support section, a rear wheel support section and a center section. The bicycle includes a rear wheel rotatably coupled to the rear wheel support section. The bicycle further includes a front wheel having a hub rotatably coupled to the front wheel support section, the hub being integrated with an energy coil system that stores energy during a forward revolving movement of the front wheel, and when the energy is fully stored, the energy coil system is locked until selectively released.

According to another exemplary embodiment, a front wheel is provided having a hub rotatably coupled to the front wheel support section. The hub being configured to couple to a plurality of radiating spokes and integrated with an energy coil system that stores energy during a forward revolving movement of the front wheel, and when the energy is fully stored, the energy coil system is locked until selectively released.

Other systems, methods, and/or products according to embodiments will be or become apparent to one with skill in the art upon review of the following drawings, and further description. It is intended that all such additional systems, methods, and/or products be included within this description, be within the scope of the present invention, and be protected by the accompanying claims.

BRIEF DESCRIPTION OF THE DRAWINGS

The above and other exemplary embodiments, objects, uses, advantages, and novel features are more clearly understood by reference to the following description taken in connection with the accompanying figures wherein.

DESCRIPTION

Figure 1:
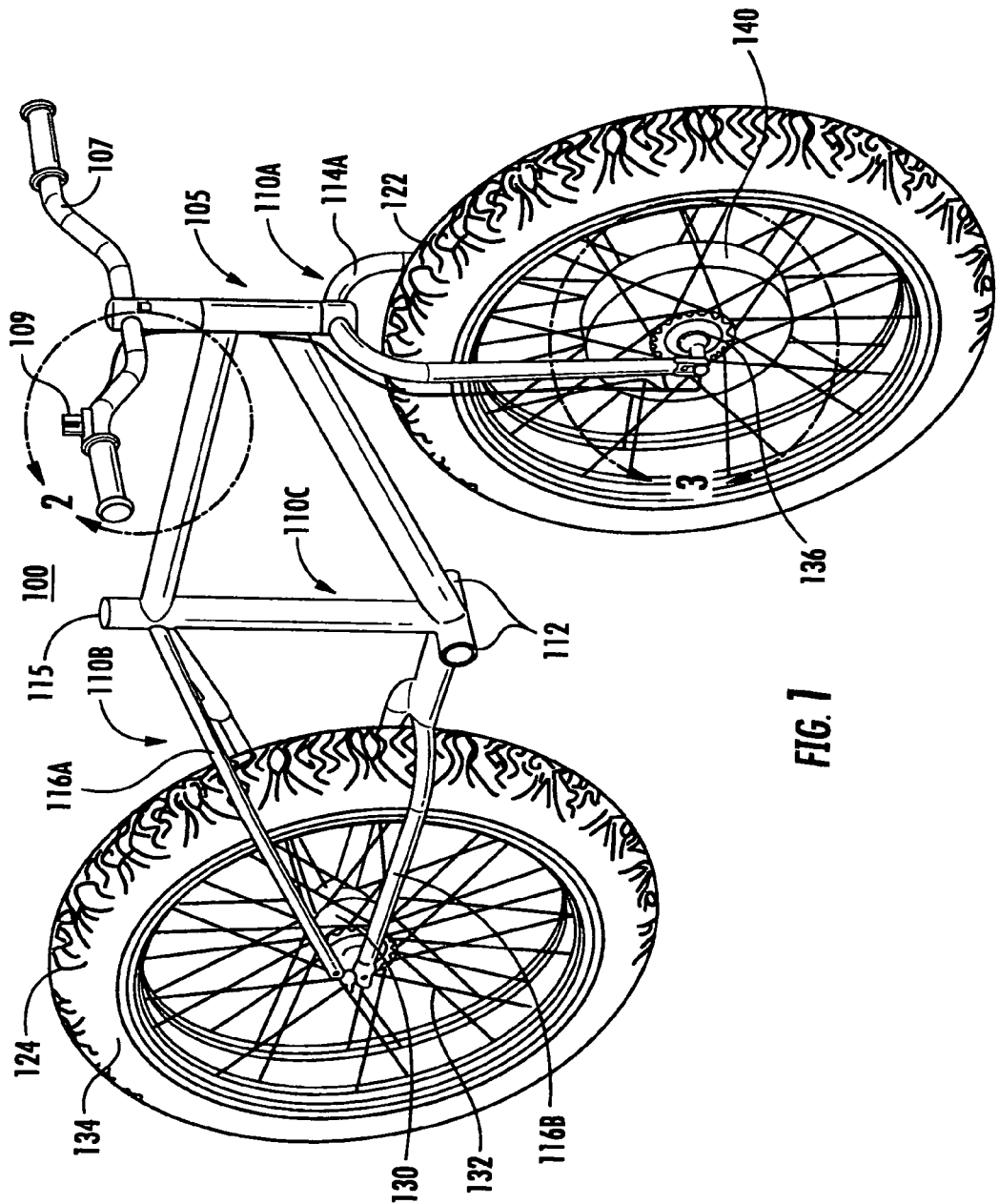
FIG. 1 illustrates a perspective view of a bicycle with an energy coil system in accordance with some exemplary embodiments of the invention.

The word "exemplary" is used herein to mean "serving as an example, instance, or illustration." Any configuration or design described herein as "exemplary" is not necessarily to be construed as preferred or advantageous over other configurations or designs. Furthermore, use of the words "present invention" are used herein to convey only some of the embodiments of the invention. For example, the words "present invention" would also include alternative embodiments and equivalent systems and components that one of ordinary skill in the art understands. For example, the materials used for the exemplary embodiments may be made out of man-made materials, natural materials, or combinations thereof. Additionally, the apparatus or components of the apparatus may be manufactured by machine(s), human(s) or combinations thereof.

Within the descriptions of the figures, similar elements are provided similar names and reference numerals as those of the previous figure(s). Where a later figure utilizes the same element or a similar element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

Some of the embodiments of the invention now will hereinafter be described more fully with reference to the accompanying drawings in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The bicycle in accordance with the present invention includes a front wheel configured with an energy coil system, the energy coil system being configured to selectively wind a coil spring during the revolving movement of the front wheel in a first direction (forward direction) to store energy. When the coil spring is completely wound, the energy coil system is locked until selectively released by an activation switch, lever or button. When the coil spring system is unlocked, the stored energy of the coil spring is released to move the bicycle in a forward direction.

In an exemplary embodiment, the coil spring has a length of approximately 180 inches and the bicycle has a length of approximately 7 feet. Thus, the energy coil system stores enough energy to move the bicycle forward a distance. In an exemplary embodiment, the distance may be the length of approximately one football field.

The energy coil system of the present invention includes a clutch assembly with a locking mechanism which locks when the coil spring is completely wound, wherein the locking mechanism is configured to be manually released (unlocked) by an activation switch, lever or button located at the handlebars of the bicycle.

The energy coil system of the present invention is configured to store (kinetic) energy while a wheel of a vehicle moves in a forward direction and releases the stored energy to drive or propel the vehicle forward in response to activation of the activation switch, lever or button.

The hub of the front wheel of the present invention is configured with a front wheel hub having integrated therein the energy coil system and which is coupled between the front wheel frame support members.

The bicycle of the present invention with a front wheel energy coil system renders the bicycle as an all-wheel drive non-motorized vehicle.

The energy coil system for bicycles is configured to selectively render the bicycle as an all-wheel drive non-motorized vehicle. The energy coil system may assist in driving or propelling by force of the front wheel, while pedals may be used to propel the rear wheel forward.

FIG. 1 illustrates a perspective view of a bicycle 100 with an energy coil system 140 in accordance with some exemplary embodiments of the present invention. The bicycle 100 includes, in general, a frame 105 having handlebars 107 attached thereto. The bicycle 100 further includes a front wheel 122 and a rear wheel 124 rotatably coupled to the frame 105. The handlebars 107 include a control mechanism 109 to control an energy coil system 140.

The frame 105 includes a front wheel support section 110A, a rear wheel support section 110B and a center frame section 110C. The center frame section 110C includes diametrically opposing pedal couplers 112 to which pedals (NOT SHOWN) are coupled to pedal the bicycle 100 and move or propel the bicycle 100 in a forward direction. The center frame section 110C further includes a seat support member 115. A seat (NOT SHOWN) is typically adjustable coupled to the top of the seat support member 115.

The front wheel support section 110A has front wheel frame supports members 114A having a U-shape. The rear wheel support section 110B has a first rear wheel frame support members 116A and a second rear wheel frame support members 116B, both of which are U-shaped. The second rear wheel frame support member 116B is coupled to and is aligned essentially straight back from the pedal couplers 112. In the exemplary embodiment, the second rear wheel frame support member 116B is approximately parallel to ground. Nonetheless, the second rear wheel frame support member 116B may have other inclination or some other orientation other than being parallel to ground depending on the arrangement of the frame 105.

The rear wheel 124 has a hub 130 from which a number of spokes 132 radiate outward toward tire 134. The tire 134 may be a rubber tire. The tire 134 may be suitable for flat ground surfaces, mountainous surfaces, sand, soft ground surfaces, etc.

A driving sprocket or chainwheel is connected by a chain to a cluster of driven sprockets, in a conventional manner. The operation of lifting and moving the chain from one sprocket to another to provide a change of gear is well known. The bicycle 100 may include a chain tensioning device to take up the slack in the chain when making the change of gear as is well known in the art and is not illustrated or described herein. The bicycle 100 includes a braking system (NOT SHOWN) coupled to at least the rear wheel 124.

The hub 130 of the rear wheel 124 is attached to both the first rear wheel frame support members 116A and a second rear wheel frame support members 116B. More, specifically, the hub 130 includes an axle disposed centrally of the hub and having ends configured to be coupled to both the first rear wheel frame support members 116A and a second rear wheel frame support members 116B of the frame 105.

The front wheel 122 of the present invention is configured with a front wheel hub 136 having integrated therein an energy coil system 140. The hub 136 of the front wheel 122 is coupled between the front wheel frame support members 114A.

The energy coil system 140 is integrated with the front wheel hub 136. The energy coil system 140 is configured to store energy during a forward revolving movement of the front wheel 122, and when the energy is fully stored, the energy coil system 140 is locked until selectively released by the control mechanism 109.

The energy coil system 140 is controlled by control mechanism 109 having at least one mode switch, the at least one mode switch being configured to selectively switch to a storing mode and, alternately, an unlock mode. The energy coil system 140 selectively stores the energy when the at least one mode switch is switched to the storing mode. Otherwise, the energy coil system 140 is idle. The energy coil system 140 is idle and uncharged or unwound.

The energy coil system 140 is released or unlocked by the control mechanism 109 so that the stored energy may be released to cause the front wheel to drive forward.

Figure 2:
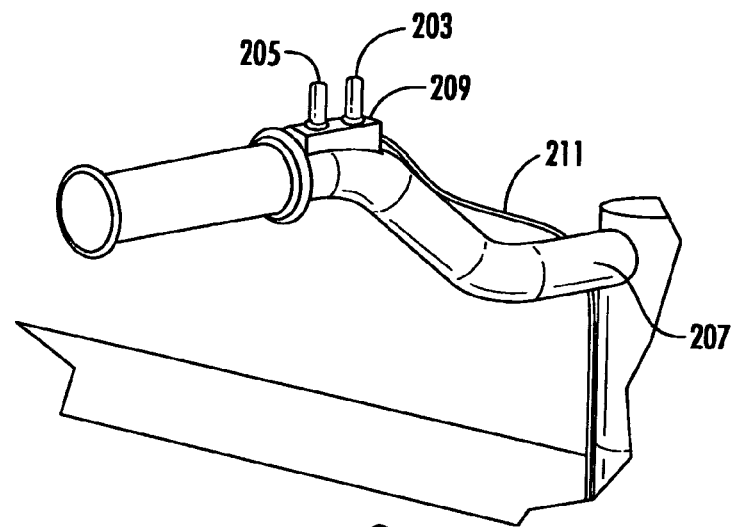
FIG. 2 illustrates a partial view of the handlebar of the bicycle of FIG. 1.

FIG. 2 illustrates a partial view of the handlebar 207 of the bicycle 100 of FIG. 1. The handlebar 207 includes the control mechanism 209 having a first lever switch 203 and a second lever switch 205. The first lever switch 203 is configured to initiate winding of the energy coil system 140 (FIG. 1) when activated (switched on). The lever may be a button such as a push button. The control mechanism 209 is coupled to cable 211 to control the energy coil system 140.

The second lever switch 205 is configured to unlock the locking mechanism engaged when the coil spring is fully wound. The second lever switch 205 may be activated or switched to an on position so that the coil spring is released and to effectuate release of the stored kinetic energy of the coil spring.

Figure 3:
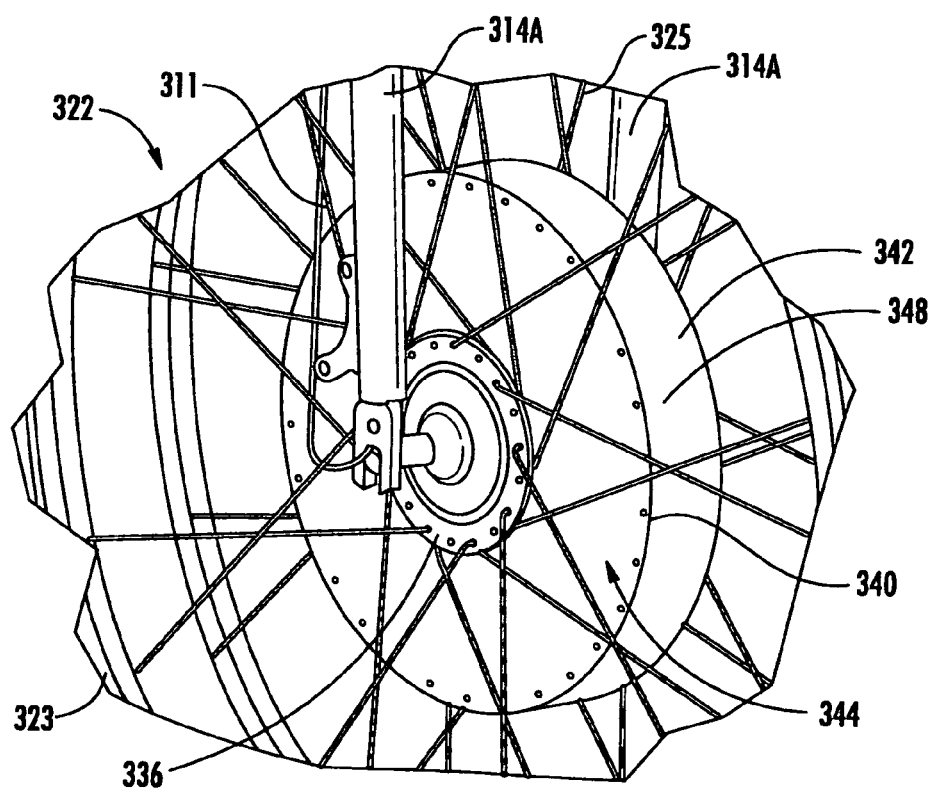
FIG. 3 illustrates a partial view of the front wheel of the bicycle of FIG. 1.

FIG. 3 illustrates a partial view of the front wheel 322 of the bicycle of FIG. 1. The energy coil system 340 includes an outer housing 342 having a generally disc-shaped structure with a first circular plate 344, a second circular plate parallel to the first circular plate 344. The first circular cover plate 344 and the second circular cover plate are held in space relation by perimeter cover rim 348. The perimeter cover rim 348 is coupled perpendicular to the outer edges of the first circular cover plate 344 and the second circular cover plate.

The front wheel 322 includes a plurality of spokes 325 radiate from hub 336 out toward a tire 323. The hub 336 is shown coupled to front wheel frame supports members 314A. The cable 311 from the handlebars is shown coupled to the hub 336 to control the modes of the energy coil system 340. The cable 311 connects to pins P1 and P2 (FIG. 4) to control the modes of operation.

Figure 4:
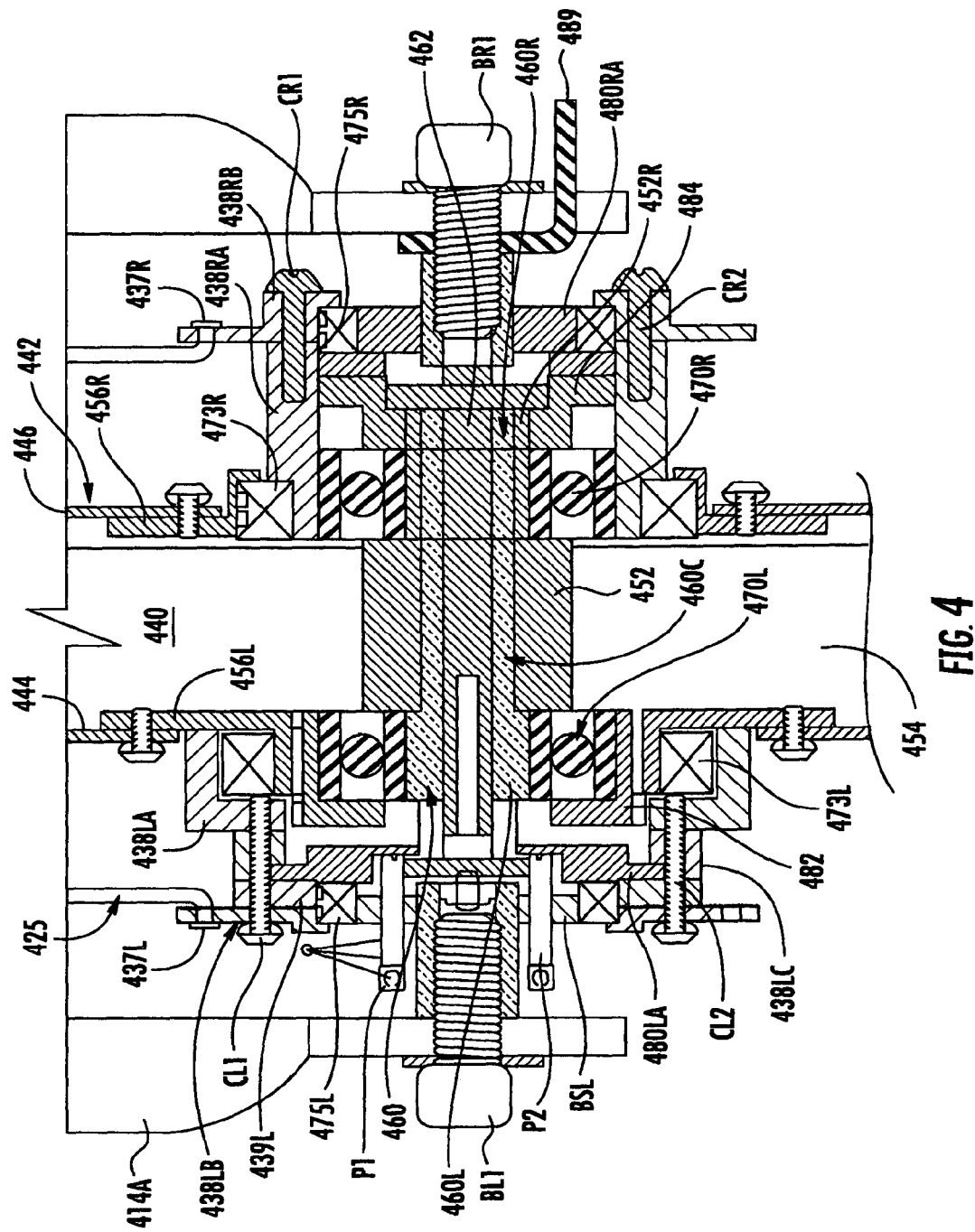
FIG. 4 illustrates a partial cross-sectional view of the energy coil system in accordance with some exemplary embodiments of the invention.

FIG. 4 illustrates a cross-sectional view of the energy coil system 440 in accordance with some exemplary embodiments of the present invention. The energy coil system 440 comprises housing 442 configured to house a coil spring 454 therein. The coil spring 454 is configured, when switched to the energy storing mode, to windup and store the energy during the forward revolving movement of the front wheel (FIG. 1) until fully wound. When the front wheel stops and the energy coil system is in the energy storing mode, the energy storing temporarily stops until forward movement of the front wheel resumes.

The hub 336 (FIG. 3) includes a left inner hub section 438LA, left outer hub section 438LB and a left center hub 438LC. A left hub spacer 439L is placed between the left inner hub section 438LA and the left center hub section 438LC. The left inner hub section 438LA includes a plurality of left spoke couplers 437L for connection to radiating left spokes 425. The left inner hub section 438LA, the left outer hub section 438LB, a left center hub 438LC and left hub spacer 439L are coupled together via first and second left couplers CL1 and CL2. The first and second left fasteners CL1 and CL2, shown diametrically opposing vertically (in a vertical plane).

The hub 336 (FIG. 3) further includes right inner hub section 438RA and right outer hub section 438LB. The right inner hub section 438RA includes a plurality of right spoke couplers 437R for coupling a plurality of right spokes. The right inner hub section 438RA and right outer hub section 438LB are coupled together via first and second right fasteners CR1 and CR2, shown diametrically opposing vertically. The first and second left fasteners CL1 and CL2 diametrically oppose the first and second fasteners CR1 and CR2 in a horizontal plane.

The energy coil system 440 includes a left outer bearing 475L and a right outer bearing 475R. The right outer bearing 475R is positioned between the right outer clutch 480RA and the right outer hub section 438RB. The left outer bearing 475L is positioned between both the left outer hub section 438LB and the left hub spacer 439L and the left outer hub bearing support BSL.

An axle 460 is coupled within the hub 336 (FIG. 3). A left side of the axle 460 includes a left axle section 460L having a first diameter. The axle 460 includes a right axle section 460R having a second diameter smaller than the first diameter. The left and right axle sections 460L and 460R are integrated with the center axle section 460C. In the exemplary embodiment, the center axle section 460C has the same diameter as the right axle section 460R. The center axis of the left, right and center axle sections 460L, 460R and 460C have a through hole having a control rod 462 journalled therein.

The control rod 462 is pulled in and out of engagement via cable 311 (FIG. 3) to change the modes of operation.

An inner coil hub or shaft 452 is provided. The inner coil hub or shaft 452 is concentric about the right and center axle sections 460R and 460C. A portion 452R of the inner coil hub or shaft 452 parallel to the right axle section 460R has a reduced diameter in comparison to the diameter with respect to the center axle section 460C. The portion 452R of the inner coil hub or shaft 452 is positioned on the right side.

A right non-reverse bearing 470R is provided around the circumference of the portion 452R of the inner coil hub or shaft 452 coincident with the right axle section 460R. A left non-reverse bearing 470L is provided around the circumference of the inner coil hub or shaft 452 coincident with the left axle section 460L.

The system 440 is coupled to the front wheel frame supports members 414A via right and left fasteners or bolts BL1 and BR1. The axis of the fasteners is parallel and alight with the axis of the axle 460. An index pin 489 is provided for a locking operation.

The housing 442 includes first cover plate 444 parallel to second cover plate 446. The first and second cover plates 444 and 446 are held in space relation by a perimeter cover rim (NOT SHOWN). The housing includes right and left spring arms 456R and 456L.

A left bearing 473L is positioned between the left inner hub section 438LA and the left spring arm 456L. A right bearing 473R is positioned between the right inner hub section 438RA and the right spring arm 456R.

The energy coil system 440 includes a clutch assembly. The clutch assembly includes a left outer clutch face 480LA, inner drum clutch 482, right outer clutch 480RA, and a right inner clutch hub 484.

Figure 5A:
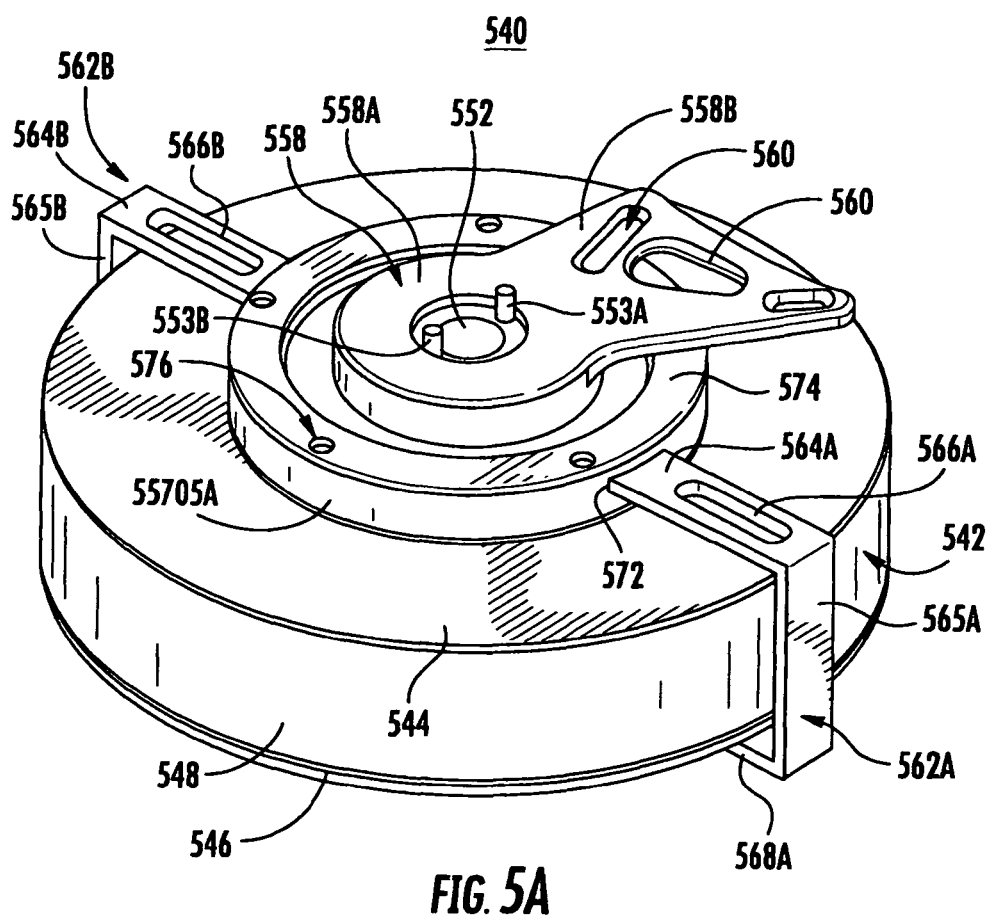
FIG. 5A illustrates a perspective view of a energy coil system in accordance with some exemplary embodiments of the invention.
Figure 5B:
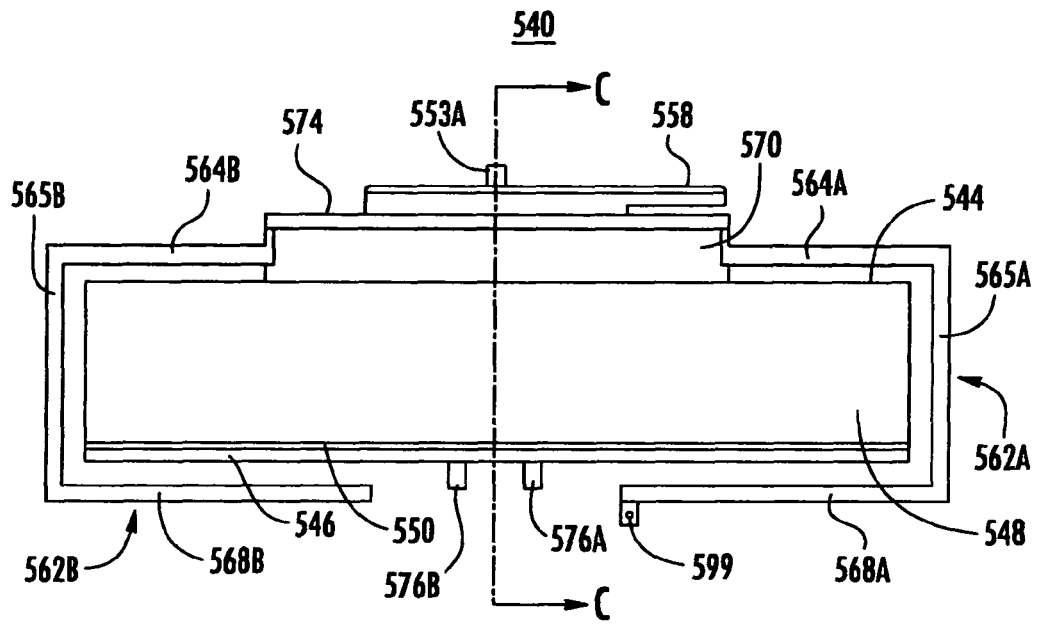
FIG. 5B illustrates an end view of the energy coil system without a drive plate in accordance with some exemplary embodiments of the invention.

FIG. 5A illustrates a perspective view of an energy coil system 540 in accordance with some exemplary embodiments of the present invention. FIG. 5B illustrates an end view of the energy coil system 540 in accordance with some exemplary embodiments of the present invention. The energy coil system 540 includes an outer housing 542 having a generally disc-shaped structure with a first circular plate 544, a second circular plate 546 parallel to the first circular plate 544. The first circular cover plate 544 and the second circular cover plate 546 are held in space relation by perimeter cover rim 548. The perimeter cover rim 548 is coupled perpendicular to the outer edges of the first circular cover plate 544 and the second circular cover plate 546.

The energy coil system 540 further includes a center coil shaft 552, a coil spring 554, and a second center coil shaft 556. The center coil shaft 552 (FIG. 5C) is in a center of the coil spring 554 and is coupled through the first circular cover plate 544 and to a first bracket assembly 558. The first bracket assembly 558 has a circular member 558A and a bracket plate 558B projection axially from a portion of the circular member 558A. The bracket plate 558B includes a plurality of elongated apertures 560 formed therein. The first bracket assembly 558 is sometimes referred to as an "anchor plate."

The energy coil system 540 includes a center hub upper section 570 having a disc-shaped section with diametrically opposing slots 572. The top of the center hub upper section 570 has a washer 574 fastened to the top thereof. The washer 574 is secured via a plurality of screws 576, bolts or other suitable fasteners.

Figure 7A:
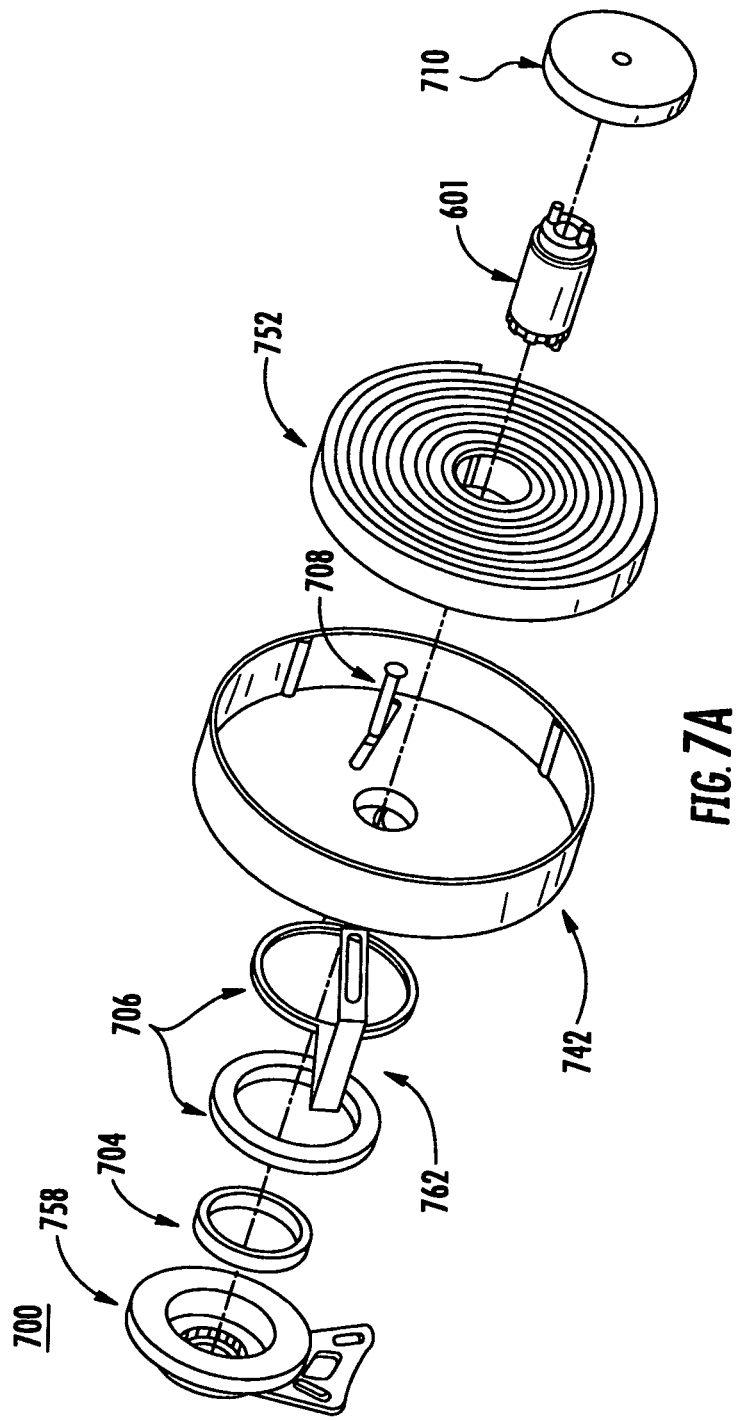
FIGS. 7A and 7B illustrate exploded views of the energy coil system from two different perspectives in accordance with some exemplary embodiments of the invention.
Figure 7B:
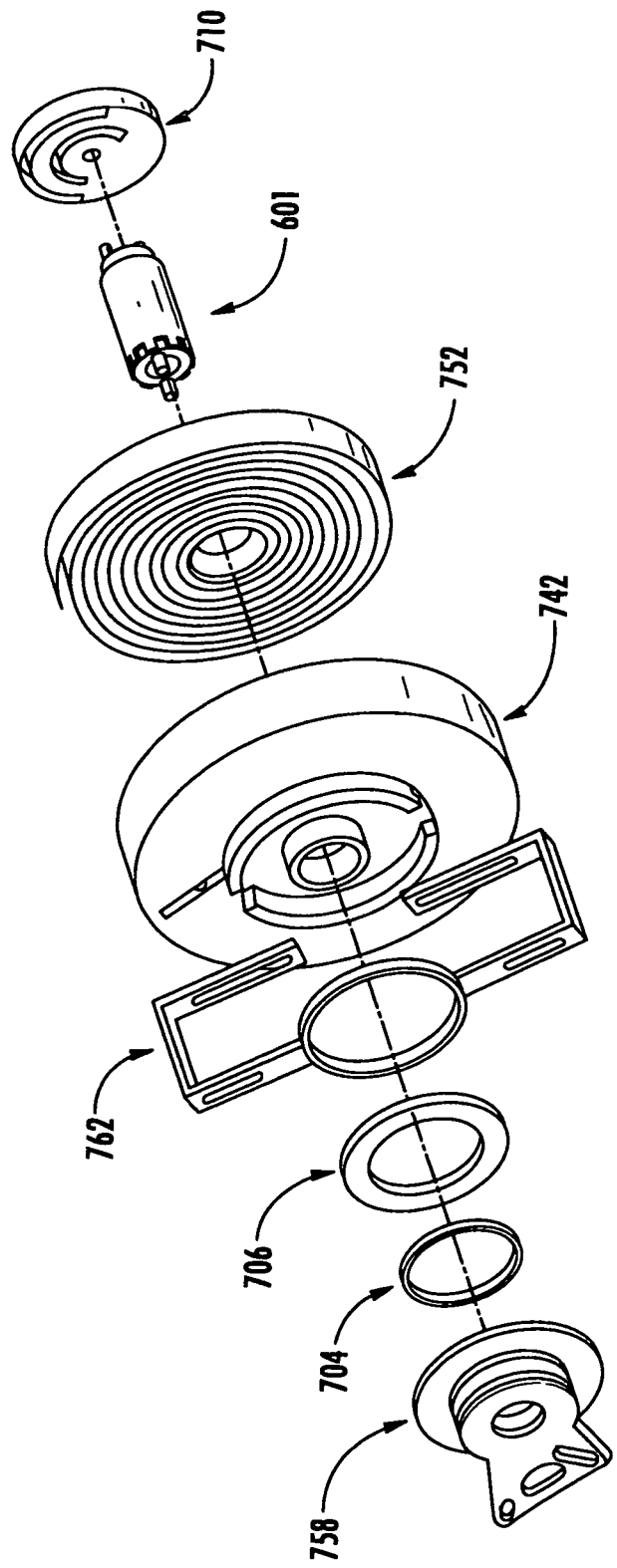

The energy coil system 540 includes a second bracket assembly 562. The second bracket assembly 562 includes a first C-section 562A and a second C-section 562B. The first C-section 562A includes a first top bracket section 564A having one end coupled to one end of a perpendicular bracket section 565A and a first bottom bracket section 568A coupled to a second end of the perpendicular bracket section 565A The second C-section 562B includes a second top bracket section 564B having one end coupled to one end of a perpendicular bracket section 565B and a second bottom bracket section 568B coupled to a second end of the perpendicular bracket section 565B. The bottom bracket sections 568A and 568B radiate toward a center of the housing 542. There is a gap between the ends of the bottom bracket sections 568A and 568B. The bottom bracket section 568A includes a pin 599 to attach the bracket to the drive plate (FIG. 7A-7B).

The first top bracket section 564A and the second top bracket section 564B are configured to be parallel to and above the first circular plate 544. Second ends of the first and second top bracket sections 564A and 564B are configured to be received in the diametrically opposing slots 572. The first and second top bracket sections 564A and 564B each include an elongated channel 566A and 566B, respectively.

Figure 5C:
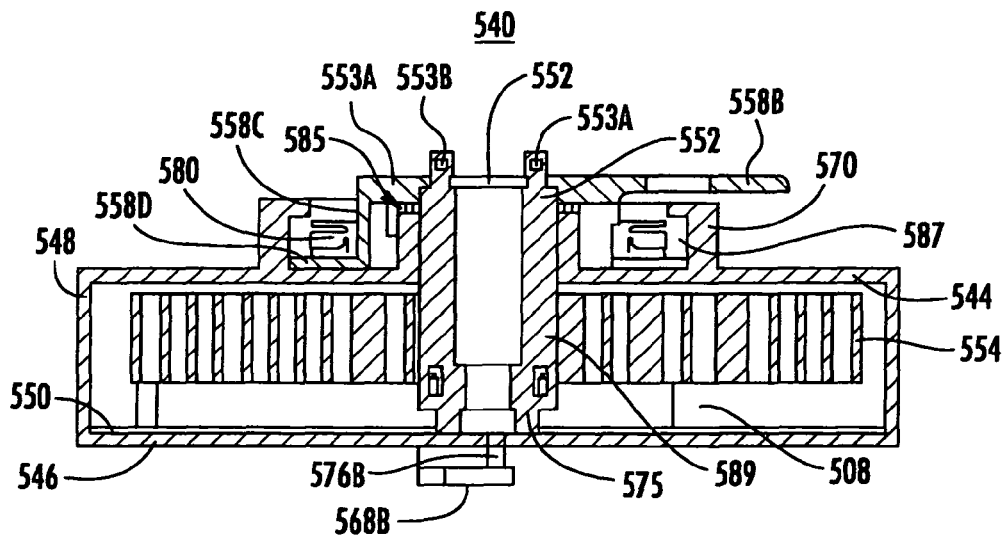
FIG. 5C illustrates a cross-sectional view along the plane C-C of FIG. 5B.

FIG. 5C illustrates a cross-sectional view along the plane C-C of FIG. 5B. The energy coil system 540 includes a coil spring 570 enclosed in housing 542 which may be made of metal. The housing 542 is configured to be coupled to a non-moving part of the vehicle (bicycle 100). Within the housing 542 and above the second circular cover plate 546, there is a secondary plate 550. The energy coil system 540 is configured to selectively wind and unwind the coil spring 570.

The energy coil system 540 further includes a drive plate adaptor 575 below the center coil shaft 552. The drive plate adaptor 575 has a center axis which is aligned with the center axis of the center coil shaft 552. The drive plate adaptor 575 is coupled to the secondary plate 550. The coil shaft 552 includes first and second projections 553A and 553B. Likewise, the drive plate adaptor 575 includes first and second projections 576A and 576B. A wave spring 589 is provided between the center coil shaft 552 and the drive plate adaptor 575. The drive plate adaptor 575 couples the shaft 552 to the drive plate (FIG. 7A-7D).

The energy coil system 540 includes internal bearing 580 coupled within the center hub upper section 570 between a neck 558C of the first bracket assembly 558. The first bracket assembly 558 includes a neck 558C coupled to base 558D. The neck 558C is parallel to the center axis of the coil shaft 552. The base 558D is aligned parallel to the first circular plate 544.

Additionally, a ratchet wheel mechanism 585 is coupled between an upper portion of the coil shaft 552 and the circular member 558A of the first bracket assembly 558. The ratchet wheel mechanism 585 is positioned around the neck 558C. The housing 542 includes a coil spring anchor pin 508 to anchor one side of the coil spring in the housing 542.

Figure 6:
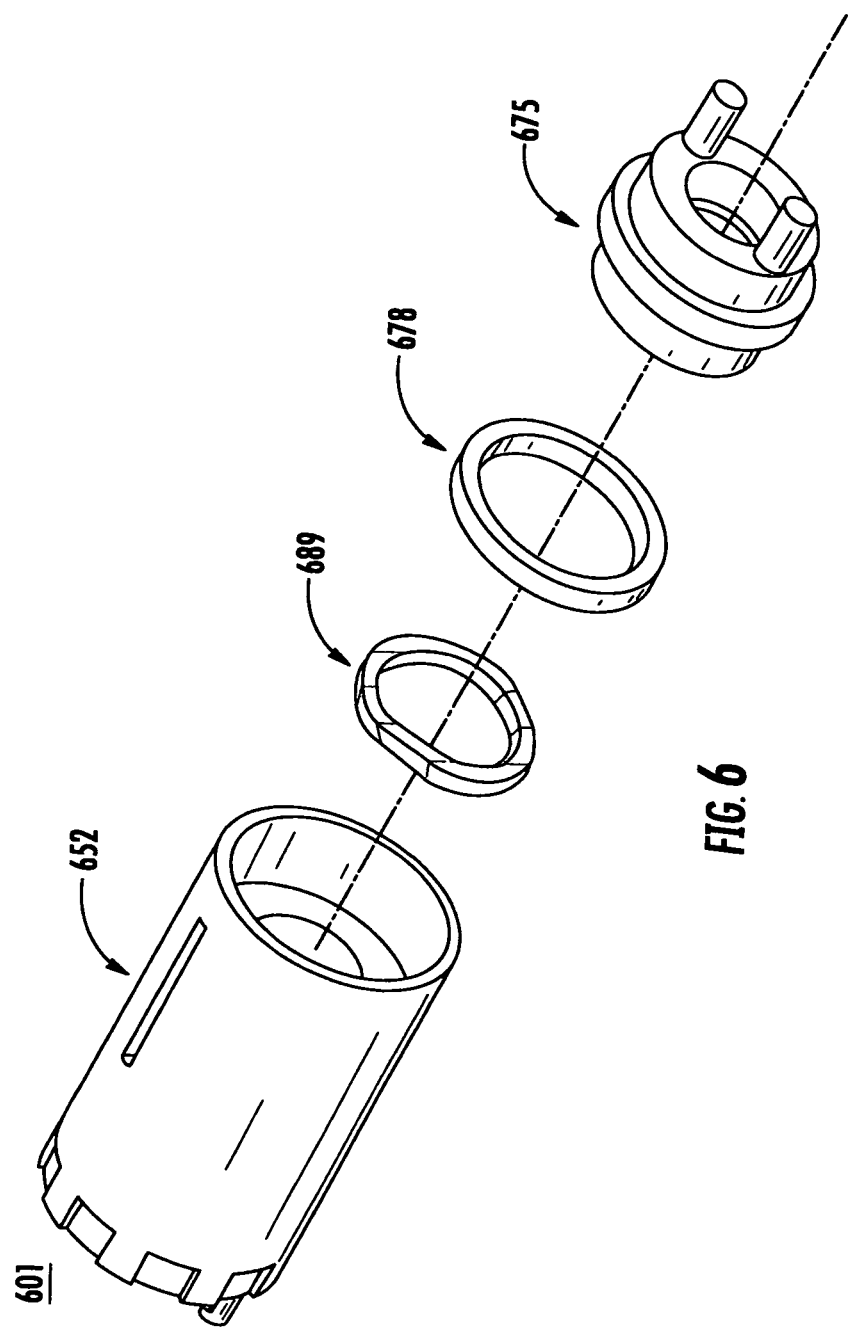
FIG. 6 illustrates an exploded view of a center coil shaft assembly in accordance with some exemplary embodiments of the invention.
Figure 7C:
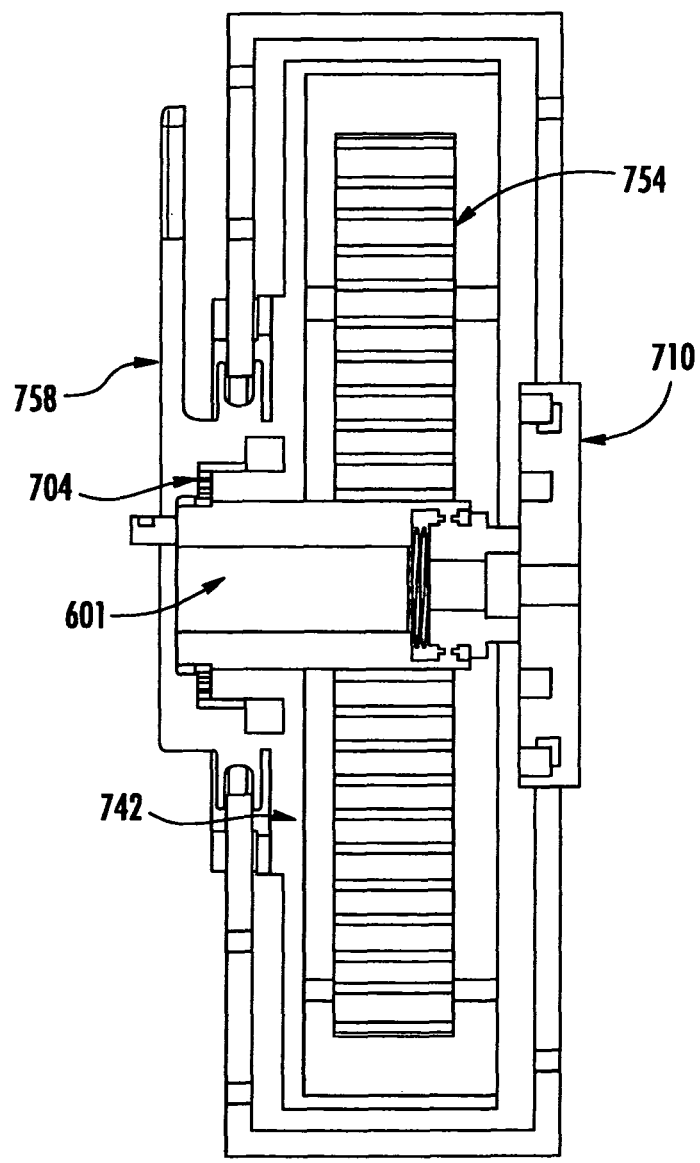
FIG. 7C illustrates a cross-sectional view of the energy coil system with the drive plate in accordance with some exemplary embodiments of the invention.
Figure 7D:
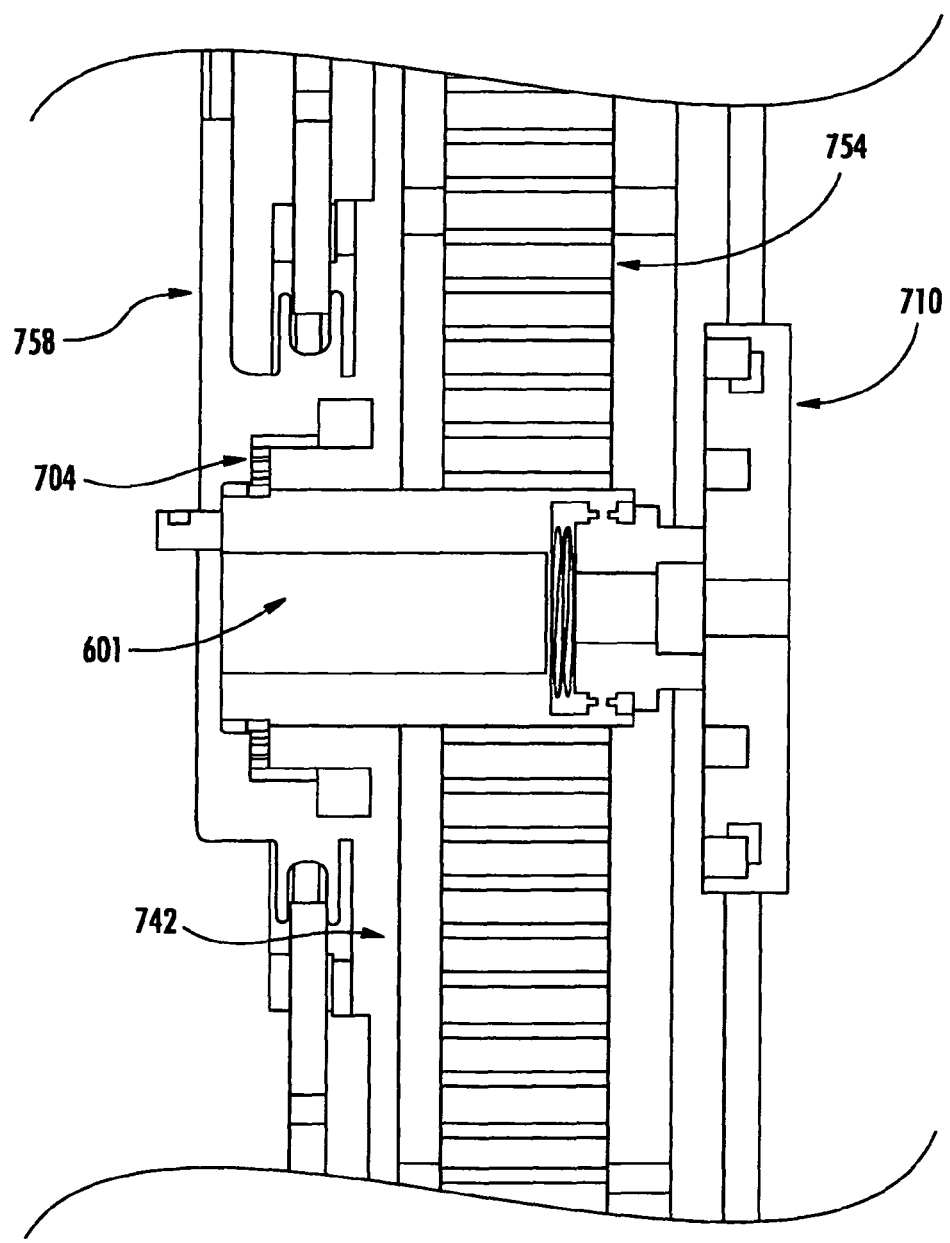
FIG. 7D illustrates a partial view of the cross-sectional view of FIG. 7C.

FIG. 6 illustrates an exploded view of a center coil shaft assembly 601. FIGS. 7A and 7B illustrate exploded views of the energy coil system 700 from two different perspectives. FIG. 7C illustrates a cross-sectional view of the energy coil system with the drive plate in accordance with some exemplary embodiments of the present invention. FIG. 7D illustrates a partial view of the cross-sectional view of FIG. 7C. The term "normal position" is used herein to refer to the mechanism when the coil spring is in the unwound and the energy coil system 700 unit is not in use.

The center coil shaft assembly 601, shown in FIG. 6, is integrated with an axle and hub and engages the drive plate 710 (FIG. 7A-7D) on an inner end. On an outer end of the center coil shaft assembly 601, the splines 589 (FIG. 5C) engage their mates located at the outer end of the anchor plate 758 (e.g., bracket 558), (FIG. 7A). The anchor plate 758 mounts securely to the bicycle frame and is concentric with the wheel axle. The shaft assembly 601 contains a wave spring 689 such that the hub is pushed in to the anchor plate splines under spring pressure. When the wound coil spring 754 in engaged for use, the hub is pushed out of this spline by input from the rider leaving the hub free to transmit the spring energy to the drive hub via an overriding freewheel-clutch 678 mounted inside the hub. Once the spring pressure has been expended, the bicycle wheel overrides the clutch 678 and continues to turn unabated. The normal position of the hub is to be engaged in the anchor plate splines.

In operation a safety mechanism and/or speed control mechanism may be provided to control the rotation of the front wheel after release of the energy of the coil spring.

The housing 742 of the system 700, containing the coil spring 754, mounts the anchor plate 758, by means of a ball bearing. The drum (housing 742) and coil spring 754 are free to rotate only in the forward direction and restrained from reverse travel by means of a one way ratchet mechanism 704. The normal position of the drum (housing 742) is to be disengaged from the drive hub. The drum (housing 742) is engaged into the drive plate 710 only during the process of winding up the coil spring 754.

The bracket 762 includes bearings 706 to engage the drum (housing 742) into the drive plate 710). The drum (housing 742) includes a coil spring anchor pin 708 that anchors the coil spring 754. The drive plate 710 is coupled to a bottom plate (e.g., 546) of the housing 742.

As best seen in FIG. 7B, the drive plate includes an engagement channel 710A denoted by the arch-shaped groove in FIG. 7B.

The control of the spring winding is provided through a drive plate 710 mounted on or integral with a hub. During normal operations, the energy coil system 700 is configured to cycle through a plurality of modes of operation. In one mode, the coil spring 754 is unwound and the system 700 is disengaged or idle. In a second mode, the energy coil system 700 is engaged and the spring is in the process of being wound up by the forward revolving movement of the front wheel. In a three mode, the spring 754 is fully wound and is locked from use (further winding). In a fourth mode, the energy coil system 700 is unlocked such that the coil spring 754 is free to unwind and propel the front wheel of a bicycle forward. The coil spring forces the front wheel to move to assist the rider in hill climbing or pulling a load using the energy stored in the spring 754. At the end of the fourth mode, the energy coil system 700 is automatically disengaged and returns to the first mode until ready for reuse.

The transition from the first mode to the second mode takes place when the rider engages the control mechanism 109 (FIG. 1) mounted to the handlebars 107 (FIG. 1) to wound the coil spring 754. The lever control translated through the cable 311 (FIG. 3) engages the drive plate 710, and as the rider peddles, the drum (housing 742) on the front wheel rotates with the wheel and winds the coil spring 754. The system 700 is in the first mode, the center coil shaft assembly 601 is prevented from rotating. Once the coil spring is fully wound, the system 700 transitions to the third mode.

In the third mode, the coil spring 754 is fully wound and drum (housing 742) needs to be automatically disengaged to prevent the bicycle wheel from suddenly stopping when the spring can wind no further. Once the drum (housing 742) disengages from the drive plate 710, the ratchet mechanism 704 prevents the spring 754 from suddenly unwinding. Since the center coil shaft 652 is also prevented from moving the spring 754 remains tightly wound (e.g., locked).

When, the system 700 is unlocked, the bicycle becomes an all-wheel drive bicycle wherein the coil spring propels the wheel forward. In normal operation, as the rider pedals, the rear wheel of the bicycle is rotated. Thus, the bicycle is in a single wheel propulsion mode. When the system 700 is unlocked, the bicycle may be a front wheel drive bicycle. If the rider also pedals simultaneously when the spring coil is unlocked, the bicycle is an all-wheel drive bicycle. The added force to move the front wheel by the spring helps the rider from get unstuck in sand, snow, or elsewhere or to move the bicycle in sand, snow or other difficult terrains. As can be appreciated, the all-wheel drive bicycle has advantages for use in all terrains, snow, sand, mountain surfaces, etc.

In the fourth mode, the rider activates the coil spring 752 to use or release the stored energy of the spring 752 wherein a force is pushed against an end of the center coil shaft assembly 601 to disengage it from the splines in the anchor plate 558. Note that the control mechanism must keep holding the hub in this position throughout the entire unwinding process. The hub should be free to rotate as the coil spring unwinds and power is transmitted to the drive plate through an overriding clutch mounted inside the hub. While the spring is unwinding, the clutch remains locked to the drive plate and transmits torque to the wheel. Once the springs' energy is depleted, the bicycle's front wheel will be traveling faster than the hub and the clutch is overridden. As the spring unwinds, the anchor pin 708 on the outer end of the spring 752 will travel outward.

Figure 8:
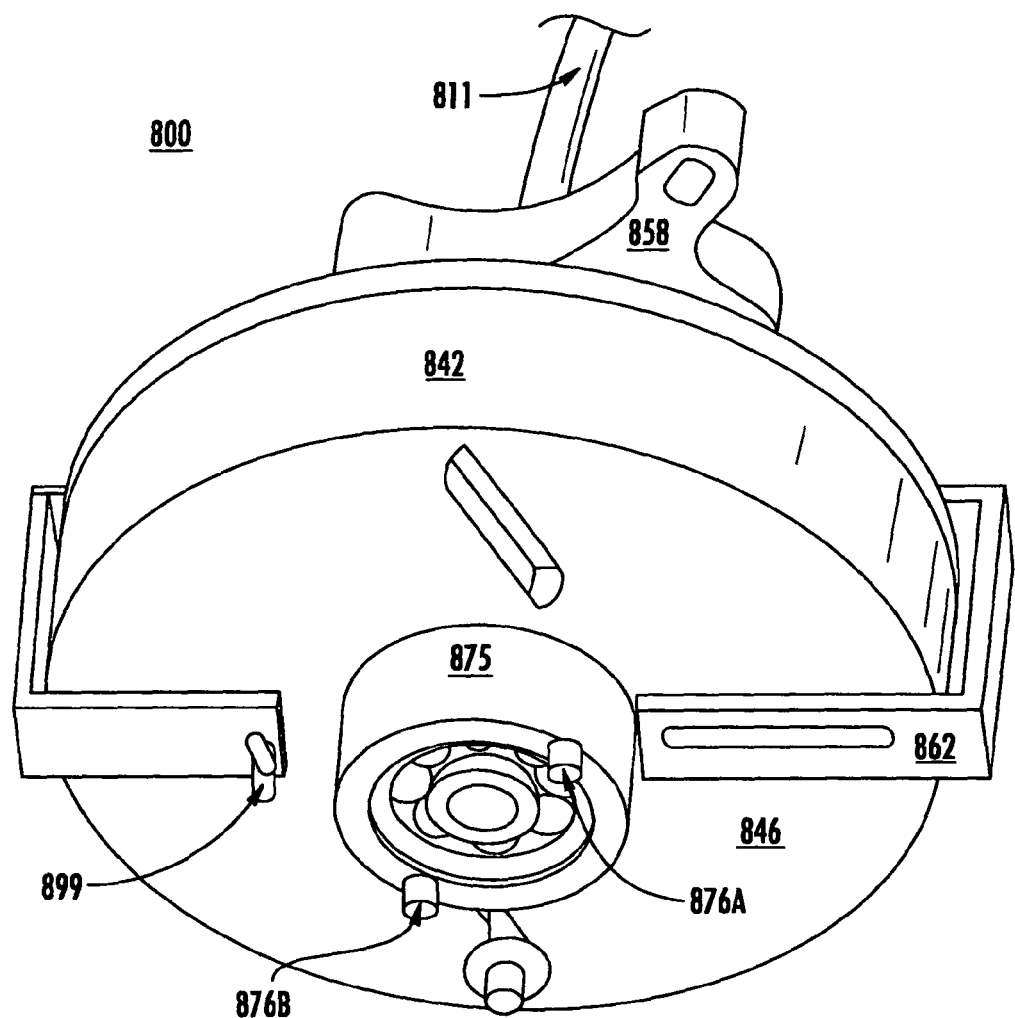
FIG. 8 illustrates a perspective view of the energy coil system from a perspective of the drive plate side in accordance with some exemplary embodiments of the invention.

FIG. 8 illustrates a perspective view of the energy coil system 800 from a perspective of the drive plate side in accordance with some exemplary embodiments of the present invention. The drum (housing 842) includes a bottom plate 846. It should be noted that during operation, the drum (housing 842) and the bracket 862 rotate with the front wheel. Pin 899 attaches to the drive plate. The drive plate adaptor 875 includes two pins 876A and 876B. The anchor plate 858 has a cable 811 attached thereto to control the operation of the system 800.

Figure 9:
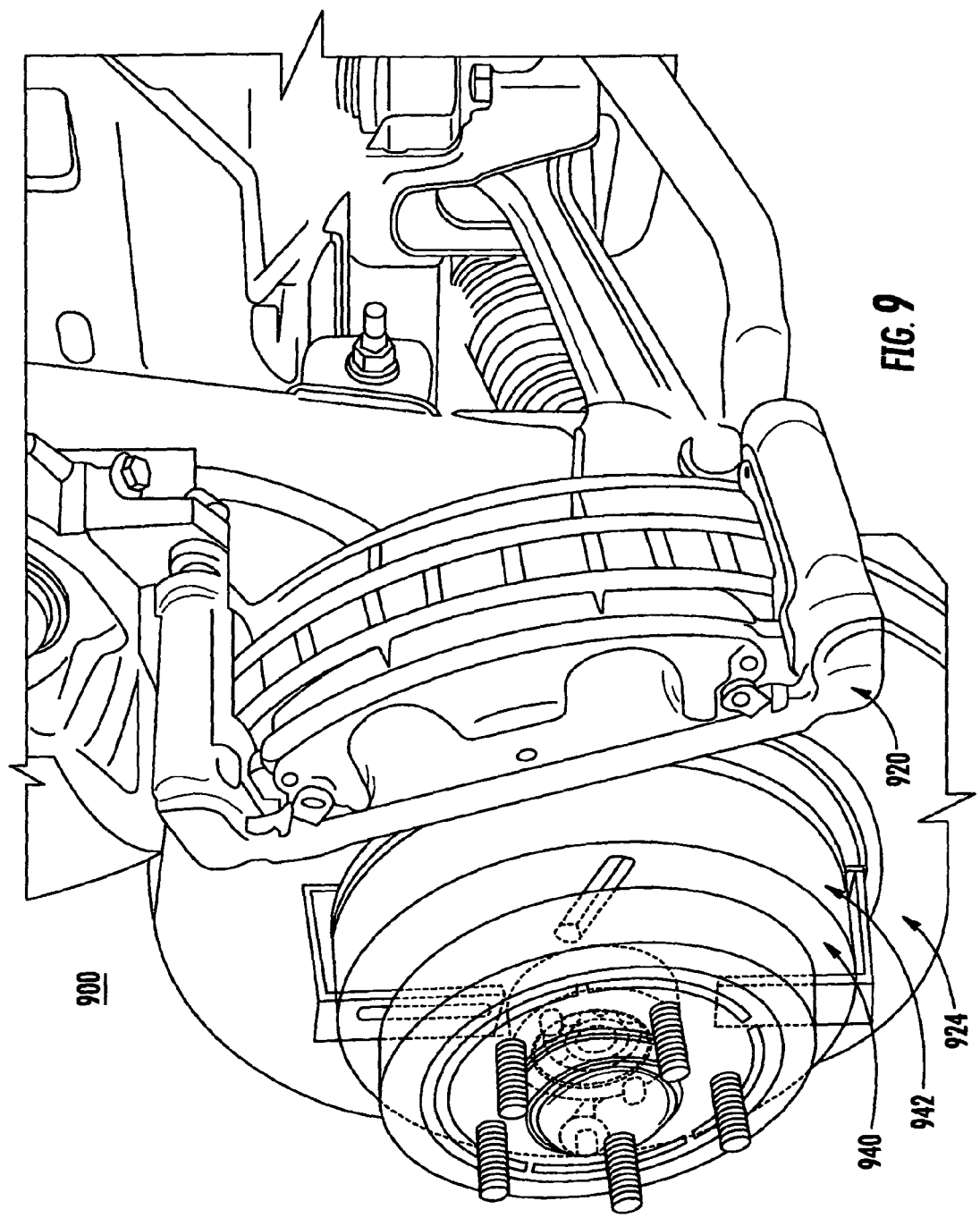
FIG. 9 illustrates a view of the energy coil system mount to a wheel of a motorized vehicle in accordance with some exemplary embodiments of the invention.

FIG. 9 illustrates a view of the energy coil system 940 mount to a wheel 924 of a motorized vehicle in accordance with some exemplary embodiments of the present invention. The energy coil system 940 includes housing 942 having a similar configuration as housing 542 except that the housing is sized for a larger hub. The hub also does not attach to spokes. A braking system 920 is shown attached to the wheel 924.

In the exemplary embodiment, the energy coil system 940 operates with the braking system 920 so that the energy coil system 940 captures energy during braking by the braking system 920. The energy storage device of the energy coil system 940 would have sufficient strength for the particular vehicle and may vary accordingly.

The bicycle, non-motorized vehicle or motorized vehicle is configured to be used on a hill, sand or soft dirt area, wherein the energy coil system serves to assist the user in propelling the bicycle, vehicle or motorized vehicle forward.

In the exemplary embodiment, the energy coil system for a bicycle may store enough energy to propel the bicycle a distance of approximately one football field.

Thus, the energy coil system of the present invention allows a user to store kinetic energy while moving forward on various terrains, such as while moving on flat ground, downhill ground or hard ground and releases the stored energy when needed such as when moving forward uphill, over sand, or soft ground areas where pedaling may be overly laborsome.

As can be readily seen, the energy coil system is placed on an axle (front or rear) of a wheel assembly so that the rotation of the (front or rear) wheel can wind up the coil spring. Once the spring is fully wound, the energy can be stored until needed. Thus, when the stored energy is manually released, the vehicle is moved forward until the coil spring is fully unwound or released.

The bicycle frame may be made of metal. For example, the frame may be lightweight and durable. The metal may include titanium, aluminum or other lightweight metals that are generally non-corrosive. The parts of the bicycle are all stainless steel or other metals. The tire may be a wide tire or a standard tire. However a wide tire allows the bicycle to be used in various terrains such as sand, mountains, snow, etc. In the exemplary embodiment, a tire may have a width of 4 inches. In the exemplary embodiment, the diameter of the tire may be 26 inches. In the exemplary embodiment, a tire rim may have a width of 4 inches.

The bicycle may be an all terrain bicycle for use on sand, in mountains, moist sand, etc.

The vehicle may be a non-motorized vehicle such as a bicycle type, scooter type, etc.

The vehicle may be a motorized vehicle such as a go-cart, an automobile, a motorcycle, etc.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A wheeled vehicle comprising:
   a vehicle frame having a front wheel support section, a rear wheel support section and, a center section;
   at least one rear wheel rotatably coupled to the rear wheel support section; and
   at least one front wheel having a hub rotatably coupled to the front wheel support section, the hub being integrated with an energy coil system that stores energy during a forward revolving movement of the front wheel, and when the energy is fully stored, the energy coil system is locked until selectively released;
   wherein the energy coil system includes a control mechanism having at least one mode switch, the at least one mode switch being configured to selectively switch between a storing mode and an unlock mode and wherein the energy coil system selectively stores the energy when the at least one mode switch is switched to the storing mode; and wherein the at least one mode switch is configured to allow stored energy to be released all at once or in small amounts; and wherein the mode switch actuates a control rod concentric with an axle of the front wheel to move the control rod into and out of engagement.

2. The wheeled vehicle according to claim 1, wherein the energy coil system comprises:

at least one coil spring configured to windup and store the energy during the forward revolving movement of the front wheel during the storing mode until fully wound;

said at least one coil spring is able to store energy; and a clutch assembly having a locking mechanism which locks the coil spring when fully wound, wherein the coil spring remains fully wound until released by the locking mechanism in response to the at least one mode switch being switched to the unlock mode, the at least one mode switch being configured to allow stored energy to be released all at once or in small amounts.

3. The wheeled vehicle according to claim 1, wherein when the energy coil system is selectively released, and the stored energy is released to directly rotate causing the front wheel to drive.

4. The wheeled vehicle according to claim 1, wherein the hub includes the axle about which said hub rotates and the energy storing system includes at least one coil spring operatively connected to said axle.

5. The wheeled vehicle according to claim 1, wherein the wheeled vehicle includes pedals and can be operated in:

a rear wheel mode when a rider pedals the vehicle;

a front-wheel drive mode when the rider releases the stored energy directly coupled to the front wheel and does not pedal; and an all wheel drive mode when the rider pedals to rotate the rear wheel and simultaneously releases the stored energy directly coupled to the front wheel.

6. The wheeled vehicle according to claim 1, wherein, the wheels include wide tires configured for a plurality of terrains.

* * * * *